Patented Nov. 22, 1938

2,137,237

UNITED STATES PATENT OFFICE 2,137,237

PRECIPITATION OF NEOARSPHENAMINE AND SULPHARSPHENAMINE

Walter G. Christiansen, Glen Ridge, N. J., and Alfred E. Jurist, Brooklyn, N. Y., assignors to E. R. Squibb & Sons, New York, N. Y., a corporation of New York No Drawing. Application January 12, 1937, Serial No. 120,240

10 Claims. (Cl. 260—444)

This invention relates to the preparation of arsenobenzene derivatives, particularly compounds of the class consisting of sulpharsphenamine (disodium-3,3'-diamino-4,4'-dihydroxyarsenobenzene-N,N'-dimethylenesulphonate) and neoarsphenamine (sodium-3,3'-diamino-4,4'-dihydroxyarsenobenzene methanol sulphoxylate).

Sulpharsphenamine and neoarsphenamine have heretofore been prepared by processes involving precipitation thereof from aqueous, often alcohol-containing, solutions by treatment with ethanol or mixtures of ethanol and ether. However, the precipitates so obtained are usually very fine powders which settle out slowly; which, when desiccated and ampuled, adhere to the inner walls of the ampules; and which, when contained in evacuated ampules, are to some extent blown out by inrushing air upon rupture of the seal.

It is the object of this invention to provide a method of preparing compounds of the class consisting of sulpharsphenamine and neoarsphenamine in the form of coarse, free-flowing, granules which do not adhere to ampule walls and are not readily blown out.

In the practice of this invention, compounds of the class consisting of sulpharsphenamine and neoarsphenamine are precipitated from their aqueous solutions (which may contain an alcohol) with isopropanol; and—in order that clear, instead of hazy, aqueous solutions may be secured—the precipitates are preferably dried with anhydrous calcium sulphate under reduced pressure. It is advantageous to carry out the precipitation anaerically, as by flooding the reaction vessels with nitrogen or carbon dioxide.

Examples

A solution of 8.1 g. of arsphenamine in 100 cc. of water is treated with 5.7 g. to 9.6 g. (three to five molecular equivalents) of sodium formaldehyde bisulphite in aqueous solution, while being constantly stirred. When the reaction is complete, the mixture is filtered and the clear filtrate is poured, with agitation, into five volumes of cold, dry isopropanol. Collecting the precipitate on a Buchner funnel, washing with isopropanol, and drying the filter cake over anhydrous calcium sulphate in a vacuum, yields sulpharsphenamine in the desired form.

A solution of 44.0 g. of arsphenamine in 180 cc. of methanol is treated at room temperature with 32 g. of sodium formaldehyde sulphoxylate dissolved in 50 cc. of water. Any precipitate formed is redissolved by adding sodium carbonate to the reaction mixture until the latter is faintly alkaline to litmus. This alkaline solution is then filtered and the filtrate poured into ten volumes of cold, dry isopropanol with constant stirring. The yellow precipitate, when collected on a Buchner funnel, washed with isopropanol, and dried in a vacuum over anhydrous calcium sulphate, gives neoarsphenamine in the desired form.

15 g. of arsphenamine base is dissolved at room temperature in a mixture of 185 cc. of water, 27 cc. of methanol, ethanol, or isopropanol, and 6.9 cc. of hydrochloric acid; and the solution is treated with 8.6 cc. of formaldehyde (37% aqueous solution). After stirring about a minute, 22.5 cc. of sodium bisulphite (37% aqueous solution) is added; and after stirring for an additional five minutes, a second and equal portion of sodium bisulphite solution is added. Agitation for another twenty minutes follows, and then filtration; and the filtrate is poured into 3.5 volumes of cold, dry isopropanol with constant stirring. The precipitate, upon being filtered off, washed with isopropanol, and dried over anhydrous calcium sulfate in a vacuum, yields sulpharsphenamine in the desired form.

It is to be understood that the examples given herein are merely illustrative and not limitative of this invention, which may be variously otherwise embodied—as with respect to the alcohol used in the reaction mixture, the proportions of the reactants, and the conditions and procedures employed—within the scope of the appended claims.

We claim:

1. In the preparation of compounds of the class consisting of sulpharsphenamine and neoarsphenamine, the step of precipitating said compounds from their aqueous solutions by means of substantially dry isopropanol.

2. In the preparation of compounds of the class consisting of sulpharsphenamine and neoarsphenamine, the step of precipitating said compounds from their lower-saturated-aliphatic-alcohol-containing aqueous solutions by means of substantially dry isopropanol.

3. In the preparation of compounds of the class consisting of sulpharsphenamine and neoarsphenamine, the step of precipitating said compounds from their methanol-containing aqueous solutions by means of substantially dry isopropanol.

4. In the preparation of compounds of the class consisting of sulpharsphenamine and neoarsphenamine the step of precipitating said compounds from their ethanol-containing aqueous solutions by means of substantially dry isopropanol.

5. In the preparation of compounds of the class consisting of sulpharsphenamine and neoarsphenamine, the step of precipitating said compounds from their isopropanol-containing aqueous solutions by means of substantially dry isopropanol.

6. In the preparation of compounds of the class consisting of sulpharsphenamine and neoarsphenamine, the steps of precipitating said compounds from their aqueous solutions by means of substantially dry isopropanol and drying the precipitate with anhydrous calcium sulphate under reduced pressure.

7. In the preparation of compounds of the class consisting of sulpharsphenamine and neoarsphenamine, the steps of precipitating said compounds from their lower-saturated-aliphatic-alcohol-containing aqueous solutions by means of substantially dry isopropanol and drying the precipitate with anhydrous calcium sulphate under reduced pressure.

8. In the preparation of compounds of the class consisting of sulpharsphenamine and neoarsphenamine, the steps of precipitating said compounds from their methanol-containing aqueous solutions by means of substantially dry isopropanol and drying the precipitates with anhydrous calcium sulphate in a vacuum.

9. In the preparation of compounds of the class consisting of sulpharsphenamine and neoarsphenamine, the steps of precipitating said compounds from their ethanol-containing aqueous solutions by means of substantially dry isopropanol and drying the precipitates with anhydrous calcium sulphate in a vacuum.

10. In the preparation of compounds of the class consisting of sulpharsphenamine and neoarsphenamine, the steps of precipitating said compounds from their isopropanol-containing aqueous solutions by means of substantially dry isopropanol and drying the precipitates with anhydrous calcium sulphate in a vacuum.

WALTER G. CHRISTIANSEN.
ALFRED E. JURIST.